(12) United States Patent
Saiki

(10) Patent No.: US 8,684,387 B1
(45) Date of Patent: Apr. 1, 2014

(54) CARGO CYCLE STEERING SYSTEM

(71) Applicant: Neal Tate Saiki, Santa Cruz, CA (US)

(72) Inventor: Neal Tate Saiki, Santa Cruz, CA (US)

(73) Assignee: NTS Works, Inc., Santa Cruz, CA (US)

( * ) Notice: Subject to any disclaimer, the term of this patent is extended or adjusted under 35 U.S.C. 154(b) by 0 days.

(21) Appl. No.: 13/684,604

(22) Filed: Nov. 26, 2012

(51) Int. Cl.
*B62K 25/16* (2006.01)
*B62K 25/04* (2006.01)

(52) U.S. Cl.
CPC ............. *B62K 25/04* (2013.01); *B26K 25/16* (2013.01)
USPC .......................................... 280/279; 280/277

(58) Field of Classification Search
USPC ......................................................... 280/277
See application file for complete search history.

(56) References Cited

U.S. PATENT DOCUMENTS

| | | | |
|---|---|---|---|
| 1,132,829 A * | 3/1915 | Cobb ............................ | 280/277 |
| 4,282,993 A * | 8/1981 | Humlong ..................... | 224/431 |
| 4,429,818 A * | 2/1984 | Patterson et al. ............. | 224/450 |
| 4,722,031 A * | 1/1988 | Matsuyama et al. .......... | 362/476 |
| 5,299,820 A * | 4/1994 | Lawwill ........................ | 280/277 |
| 5,398,954 A * | 3/1995 | Chonan ......................... | 280/276 |
| 5,743,547 A * | 4/1998 | Voss et al. ..................... | 280/277 |
| 5,749,590 A * | 5/1998 | Roerig ........................... | 280/276 |
| 7,273,221 B2 * | 9/2007 | Ockenden .................. | 280/288.4 |
| 7,287,615 B2 * | 10/2007 | Michisaka et al. ............ | 180/219 |
| 8,534,692 B2 * | 9/2013 | Trebichavsky ................ | 280/277 |
| 2009/0289091 A1 * | 11/2009 | Ulrich ........................... | 224/447 |

* cited by examiner

*Primary Examiner* — Tony Winner
(74) *Attorney, Agent, or Firm* — Landmark Intellectual Property Law, PC

(57) ABSTRACT

A steering system for a cycle that facilitates the placement of a horizontal cargo platform above and in close proximity to the front wheel. The steering system may be applied to numerous types of cycles including bicycles, electric bicycles, scooters, motorcycles, three wheeled vehicles, etc. The steering system comprises a fork assembly that is rotatably mounted to the frame near the top of said fork. The fork is supported in its lower portion by pushrods that both steer and structurally support the fork assembly.

7 Claims, 3 Drawing Sheets

Frame Assembly Detail

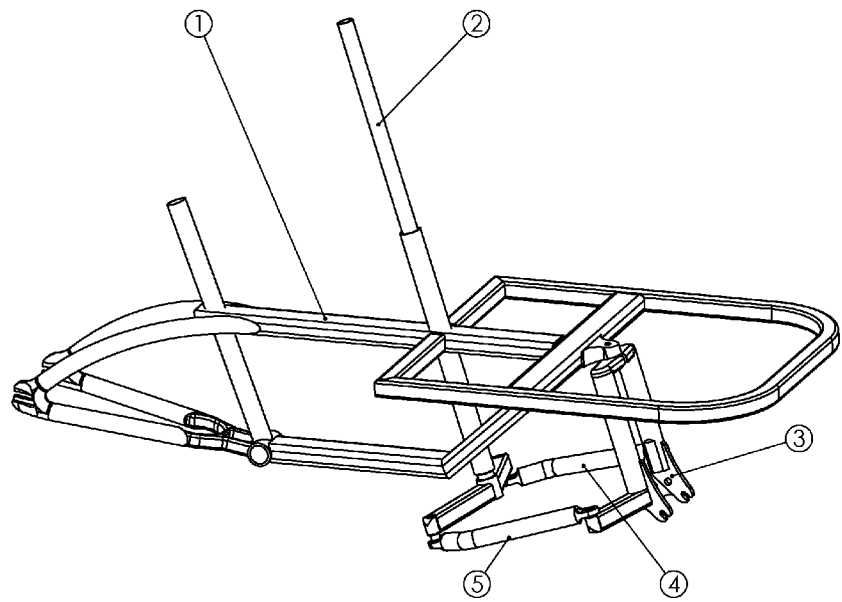
Figure 1, Frame Assembly
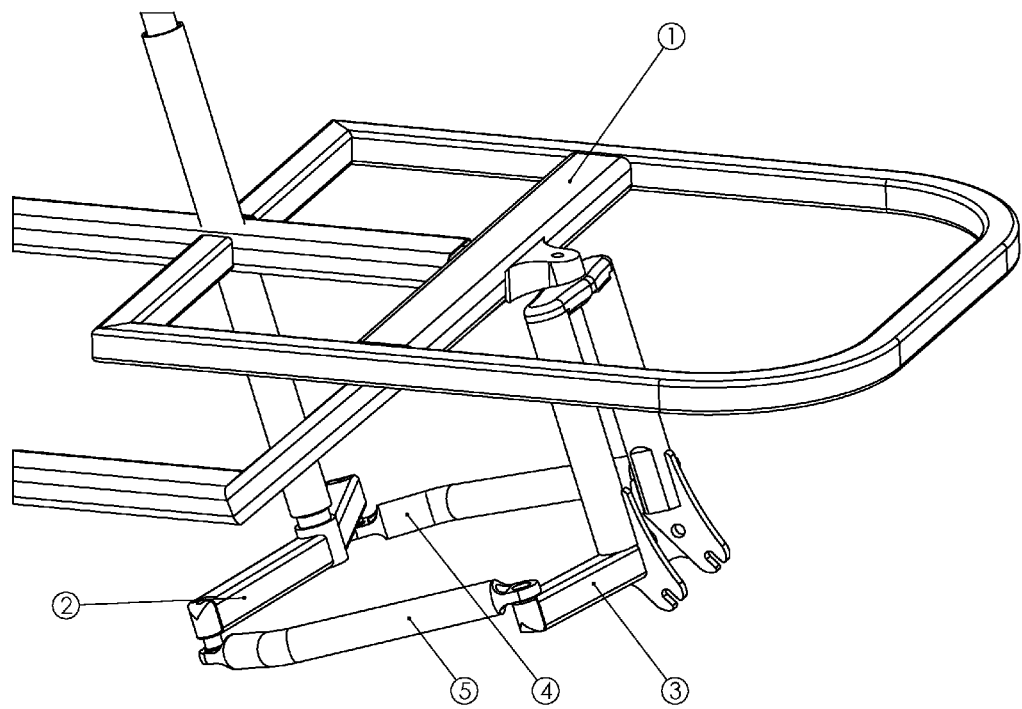
Figure 2, Frame Assembly Detail

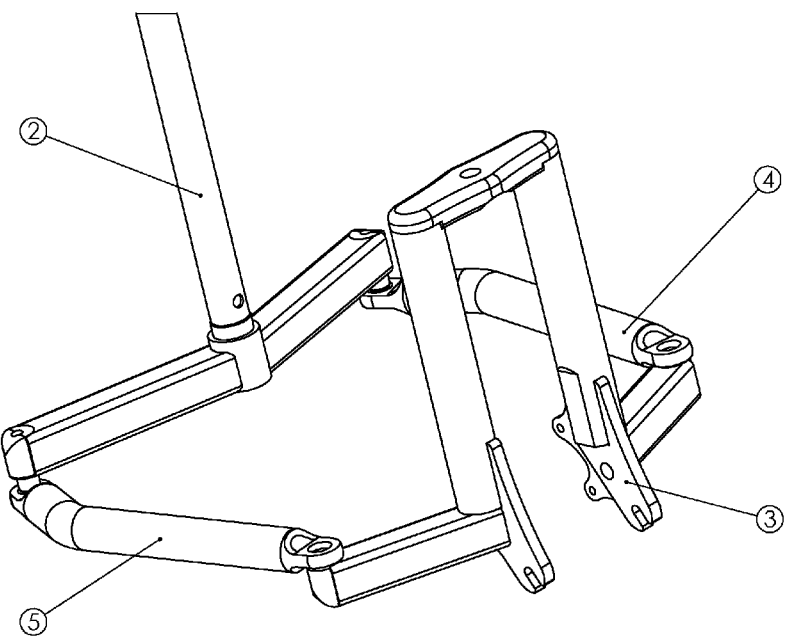
Figure 3, Steering Components
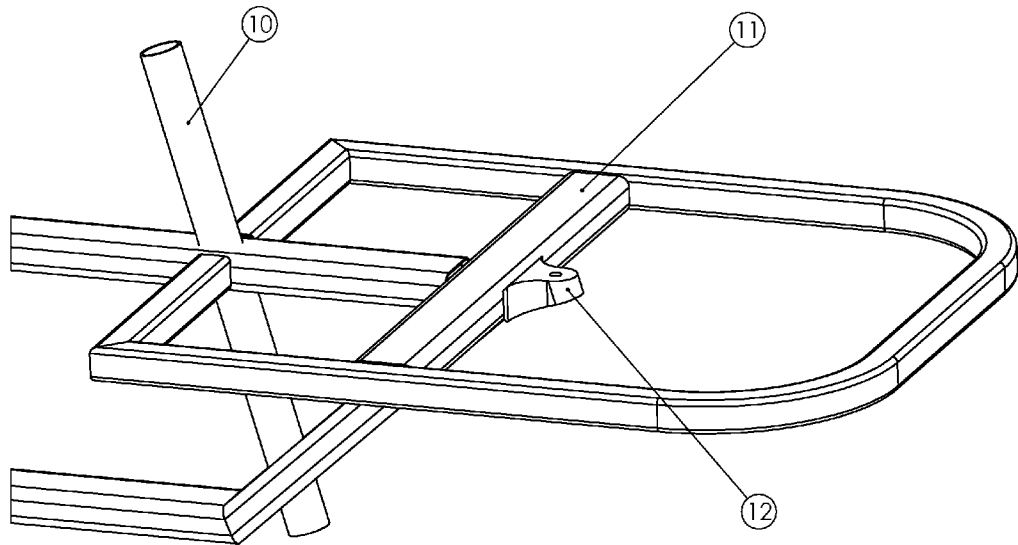
Figure 4, Frame Detail

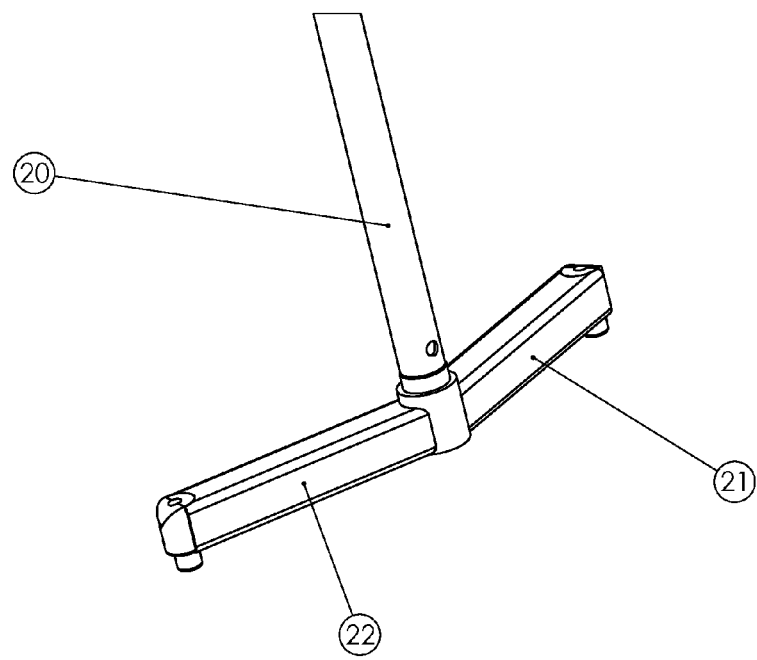
Figure 5, Steerer Assembly
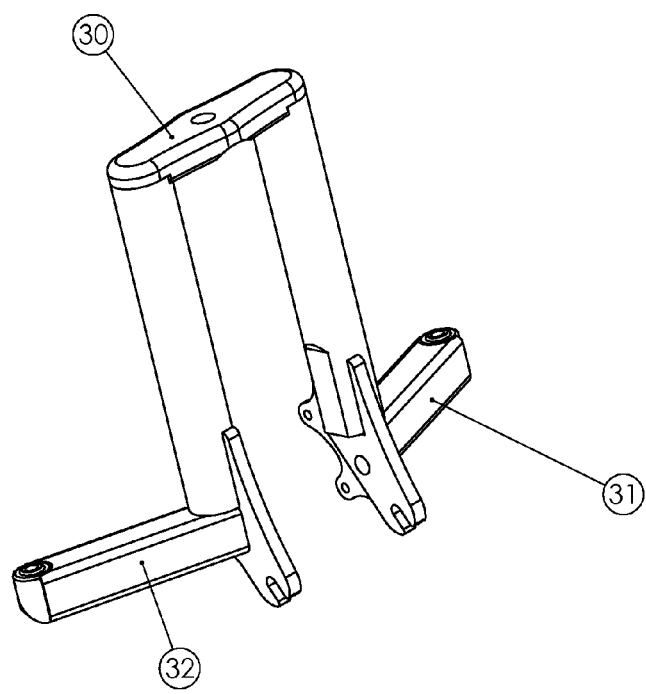
Figure 6, Fork Assembly

CARGO CYCLE STEERING SYSTEM

BACKGROUND

1. Field of Invention

This invention relates to the construction of a cycle that is designed to carry cargo such as groceries, boxes, bags, passengers, etc. The cycle could be a bicycle, motorcycle, scooter, etc. Regular bicycles or motorcycles are designed around the rider and do not easily facilitate the carrying of bulky cargo. There are a few bicycles that are designed specifically to carry cargo and these are loosely referred to as cargo bicycles.

2. Discussion of Prior Art

I have found that existing cargo bicycles do not have a good combination of short wheelbase and a good location to carry cargo. Most cargo bicycles are of a standard bicycle configuration and merely have cargo areas in front of the handlebars or in back of the rider.

The cargo bikes that have a cargo area in front of the handlebars have the disadvantage of carrying their load too far forward and can tip forward when fully loaded. The cargo area has to be attached to either the frame or steering assembly. If it is attached to the steering, the steering is very heavy when loaded with cargo. The other solution is to extend the frame in front of the steering assembly, but this puts more weight in an undesirable location.

A few cargo bikes have a long wheelbase with a cargo area in between the rider and the front wheel. This location of the cargo area is better for weight distribution. The major disadvantage of a long wheelbase is that the maneuverability is greatly reduced. The long wheelbase is slow to react to steering inputs and requires exaggerated turning of the handlebars. The minimum turning radius is also increased and makes it difficult to maneuver in tight quarters.

Another configuration is to relocate the handlebars toward the rear of the bike. This allows the cargo area to be above the frame head tube. The frame head tube is the tube that holds the fork bearings for rotatably mounting a front fork. The head tube must be on the order of 5 inches (125 millimeters) long in order to position the fork bearings to resist front to back bending loads on the fork. Therefore the cargo area has to be positioned more than 6 inches (150 millimeters) above the front wheel. This location produces a high center of gravity when loaded with cargo. This makes the bike prone to tipping over and difficult to maneuver. It is also difficult to load and unload cargo when it is high off of the ground.

Motorcycle designs have the same drawbacks as conventional bicycles when it comes to carrying cargo. The rider position and handlebars are roughly in similar positions.

Thus, there is lacking, inter alia, a cargo cycle design that has both a short wheelbase and locates the cargo area in good location for weight distribution.

DRAWING FIGURES

The disclosed embodiments have other advantages and features which will be more readily apparent from the detailed description, the appended claims, and the accompanying figures (or drawings). A brief introduction of the figures is below.

FIG. 1, Frame Assembly: the complete frame assembly.

FIG. 2, Frame Assembly Detail: expanded view frame assembly showing the steering mechanism.

FIG. 3, Steering Components: steering mechanism with frame removed

FIG. 4, Frame Detail: expanded view of frame without steering mechanism.

FIG. 5, Steerer Assembly: isolated view of steerer assembly.

FIG. 6, Fork Assembly: isolated view of fork assembly.

List of Reference Numerals in Drawings:

| | |
|---|---|
| 1. | main frame assembly |
| 2. | steerer assembly |
| 3. | fork assembly |
| 4. | left pushrod |
| 5. | right pushrod |
| 10. | frame steerer tube |
| 11. | frame platform area |
| 12. | frame fork pivot |
| 20. | steerer tube |
| 21. | left steerer arm |
| 22. | right steerer arm |
| 30. | fork |
| 31. | left fork arm |
| 32. | right fork arm |

DESCRIPTION

First Embodiment

One embodiment of the current invention is illustrated in perspective in FIG. 1. This is an example of a cargo bicycle frame assembly. These drawings are of the frame only. The components such as wheels, handlebars, seat, etc. have been omitted for clarity.

A main frame assembly 1 is the central non-moving framework of the cycle. The frame assembly from the middle rearward can be fairly conventional and may comprise mounting locations for: a rear wheel or wheels, a seat post and a pedal crank.

A steering assembly 2 is rotatably attached to the main frame assembly 1 near the front middle of the main frame assembly. The axis of rotation of the steering assembly 2 is generally located on the center plane that divides the main frame assembly into left and right. The axis of rotation is generally vertical or near vertical with the top of the axis tilted rearward.

A fork assembly 3 is rotatably attached to the main frame assembly 1 near the front of the main frame assembly. The axis of rotation of the fork assembly 3 is generally located on the center plane that divides the main frame assembly into left and right. The axis of rotation is generally vertical with the top of the axis tilted rearward in a manner parallel or close to parallel, but not collinear with the axis of steering assembly 2 axis of rotation.

A left pushrod 4 is pivotably or rotatably connected to the steering assembly 2 at one end and the fork assembly 3 at the other end. A right pushrod 5 is pivotably or rotatably connected to the steering assembly 2 at one end and the fork assembly 3 at the other end. A left pushrod 4 is generally located to the left of the left-right center plane and a right pushrod 5 is generally located to the right of the left-right center plane. The left and or right pushrods are not necessarily straight elongated members. They may be bent to facilitate clearance for the front wheel as shown in this embodiment. They may also be straight, curved or with multiple bends.

FIG. 2 is an expanded view of the frame assembly showing the steering mechanism. In FIG. 2, the general interconnection between the elements can be seen more clearly.

FIG. 3 is an expanded view of the steering components with the main frame assembly removed for clarity.

FIG. 4 shows the front half of the main frame assembly in detail. The main frame assembly 1 has a frame steerer tube 10, a frame platform area 11 and a frame fork pivot 12. The frame steerer tube 10 is located near the front middle of the main frame assembly. The center axis of the frame steerer tube 10 is generally located on the center plane that divides the main frame assembly into left and right. The center axis of the frame steerer tube is generally vertical. The top of the center axis tilted rearward. The frame platform area 11 is a generally flat area of structure located mostly forward of the frame steerer tube 10. The orientation of frame platform area 11 is generally parallel to the ground plane, but may be tilted slightly. The vertical location of the frame platform area 11 is above and close to the front wheel area. The frame fork pivot 12 is located vertically in between the wheel area and the frame platform area 11.

The frame platform area generally defines the lower portion of the cargo area. However, there could be additional cargo area below the frame platform area as long as it doesn't interfere with the front wheel. For instance, a passenger leg area could extend below the frame platform area as long there is clearance for the front wheel.

FIG. 5 is an isolated view of steerer assembly 2. The steerer assembly is a roughly upside down "T" shaped structure. A steerer tube 20 is a round tube and functions as a mount for the handlebar stem and or handlebar assembly at its upper end. The steerer tube is connected to the main frame by a bearing for rotational movement. On the lower end of the steerer tube, a left steerer arm 21 and a right steerer arm 22 are attached in a roughly horizontal position. In this embodiment, the arms are angled slightly rearward to facilitate tire clearance. At the end of each arm is a pivotable or rotatable attachment point for the left pushrod and right pushrod.

FIG. 6 is an isolated view of fork assembly 3. The fork assembly has some elements in common with conventional bicycle or motorcycle forks. In the middle is a conventional combination of parts that make up a fork 30. The fork 30 is an inverted "U" assembly. The significant difference between a fork 30 and a conventional fork is the omission of a conventional fork steerer tube attached to the upper portion. At the upper end of the fork is a rotatable means to attach to the frame pivot 12. At each lower end of the fork are means for mounting the front wheel. Attached to the left side of the fork 30 is a left fork arm 31. The left fork arm 31 is an elongated member that attaches to the fork 30 on one end. It is oriented roughly horizontal and outward to the left. At the other end of the fork arm 31 is a rotatable means to attach to an end of the left pushrod 4. The right fork arm 32 is an elongated member that attaches to the fork 30 on one end. It is oriented roughly horizontal and outward to the right. At the other end of the fork arm 32 is a pivot or rotatable means to attach to an end of the right pushrod 5.

The means for rotatably attaching the fork assembly 3 to the main frame 1 must be sufficiently sturdy to resist left or right bending forces. The magnitude of these left or right bending forces are generally an order of magnitude less than the front to back bending forces that occur when the front wheel hits a bump. Since the front to back bending forces are handled by the pushrods, the maximum bending forces on the fork assembly 3 are much smaller than on traditional cycles. This allows the use of a much smaller than normal fork bearing spacing to resist front to back bending moments.

A very short fork steerer tube could also be used. The bearings could be spaced very close to each other on the order of 3 inches (50 mm) or less. Alternatively, a traditional fork steerer tube with dual bearings can be eliminated in favor of a single large diameter bearing and no fork steerer tube. Numerous bearings or bearing combinations could be used such as needle roller, plain, tapered, angular contact or sealed cartridge bearings.

With the fork rotating means being very short in height, the location of the frame platform area 11 can be vertically located very close to the top of the front wheel. The clearance can be on the order of 5 inches (125 mm) or less.

Operation

The fork assembly 3 must be held to allow rotational movement for steering, but also constrained to resist translational movement. At the top of the fork 30, the fork assembly 3 is rotatable attached to the main frame 1. This constrains the upper end of the fork assembly from translational movement. The fork assembly 3 has an axis of rotation is roughly parallel to the steerer assembly 2 axis of rotation. The lower end of the fork assembly 3 is constrained from translational movement by the left pushrod 4 and the right pushrod 5. When the front wheel hits a bump, the resulting force from the front wheel is roughly rearward and upward. The left pushrod 4 and right pushrod 5 are oriented roughly in the front to back direction and therefore support the lower end of the fork assembly 3 in the rearward direction. The combination of upper and lower support of the fork assembly allows it to resist bump induced translational movement.

Steering of the cycle comes from handlebars mounted directly or indirectly to the steerer tube 20. Rotation of the Steerer tube 20 rotates the left steerer arm 21 and the right steerer arm 22. The ends of the steerer arms push and pull on the left pushrod 4 and the right pushrod 5. The push and pull of the pushrods then rotate the fork assembly 3.

Additional Embodiments

An additional embodiment of the fork assembly 3 could be made by reducing in size or possibly eliminating the left fork arm 31 or the right fork arm 32. In this case, the left pushrod 4 or right pushrod 5 would attach directly to the fork assembly 3. The pushrods would have to clear the front tire at full steering angle by having bent pushrods. The left pushrod 4 and right pushrod 5 could be bent more to increase tire clearance. This would allow the pushrods to be located closer to the left right center plane of the cycle. The left fork arm 31 and right fork arm 32 could then be greatly reduced in size. The fork assembly 3 could be assembled from any number of pieces by either combining pieces or adding additional pieces.

An additional embodiment of the steerer assembly 2 could be made by changing the structure of the left steer arm 21 and the right steerer arm 22. These elements could be combined into one piece. There could be additional structure added to support or triangulate the steerer arms. The steerer assembly 2 could be assembled from any number of pieces by either combining pieces or adding additional pieces.

The cargo platform can take on any number of configurations. It could be removable or reconfigurable. It could also be a four, five or six sided box structure. It could also be a child carrier or passenger seat for one or more. Additional structure around and or above the frame platform area could be added. Fixed or moveable rails on one or more sides could be added for the purpose of keeping cargo contained on the platform. Covers, lids, nets and other structures could be used above the cargo platform area to contain or shelter the cargo from the elements.

An additional embodiment of the fork assembly 3 could be made with a suspension fork. In this type of fork, the lower portion of the fork would be allowed to move in a controlled fashion relative to the upper portion of the fork. Numerous suspension fork designs are common. Integrating a suspension fork would be facilitated by pivoting connections at the ends of the pushrods. This would allow the lower portion of the fork to move vertically and not be vertically constrained by the pushrods.

CONCLUSION, RAMIFICATIONS AND SCOPE

Thus the reader will see the cargo cycle steering system provides a unique solution to the problems of making a cycle capable of carrying cargo while having a low center of gravity and a short wheelbase. The ability to have the cargo area lowered to being very close to the top of the front wheel is an enormous advantage.

There are further applications of the cargo cycle steering system to various types of cycles such as: motorcycles, tricycles (three wheeled vehicles), scooters, mopeds, etc.

While various embodiments in accordance with the present invention have been described, it is understood that the invention is not limited thereto, and is susceptible to numerous changes and modifications as known to those skilled in the art. For example, the cargo area could have numerous forms such as a fixed water tank, child seat, etc. The fork assembly and steerer assembly could be constructed from and number of pieces or additional pieces could be added. Therefore, this invention is not limited to the details shown and described herein, and includes all such changes and modifications as are encompassed by the scope of the appended claims.

I claim:

1. A steering system for a cycle comprising:
   a) a main frame assembly,
   b) a fork assembly rotatably connected to said main frame assembly near the top of said fork assembly,
   c) a steerer assembly rotatably connected to said main frame assembly with an axis of rotation approximately parallel to, but not collinear with, the axis of rotation of said fork assembly,
   d) a left pushrod, oriented roughly parallel to the direction of travel of said cycle, pivotably connected on one end to the left side of said steerer assembly and pivotably connected on the other end to the left middle to left lower region of said fork assembly,
   e) a right pushrod, oriented roughly parallel to the direction of travel of said cycle, pivotably connected on one end to the right side of said steerer assembly and pivotably connected on the other end to the right middle to right lower region of said fork assembly,
   f) whereby said fork assembly is supported by said left pushrod and said right pushrod to resist front to back forces and steer said fork assembly.

2. The steering system for a cycle in claim 1 wherein one or more of the pivotably connected ends on either the left pushrod or the right pushrod is a rotatably connected end.

3. The steering system for a cycle in claim 1 wherein said cycle is a bicycle, electric bicycle, moped, scooter or motorcycle.

4. The steering system for a cycle in claim 1 wherein said fork assembly is a suspension fork.

5. The steering system for a cycle in claim 1 wherein said main frame assembly includes a cargo area located in close proximity to the top of the front wheel.

6. The steering system for a cycle in 5 wherein said cargo area has a fixed or removable horizontal platform.

7. The steering system for a cycle in claim 6 wherein said horizontal platform is less than 5 inches (125 mm) from the top of the front wheel.

* * * * *